United States Patent Office 3,294,577
Patented Dec. 27, 1966

3,294,577
BARRIER COATED THERMOPLASTIC OLEFIN
HIGH POLYMER SUBSTRATES
Walter P. Mayer, Lebanon, N.J., assignor to Union Carbide Corporation, a corporation of New York
No Drawing. Filed Aug. 2, 1963, Ser. No. 299,483
10 Claims. (Cl. 117—138.8)

This invention relates to barrier coated thermoplastic polymer substrates and, preferably, to olefin high polymer substrates coated with a moisture resistant barrier coating composition providing impermeability to gases such as oxygen, and organic liquids.

Packaging formed from thermoplastic polymer includes overwrap film, molded bottles and containers of various shapes. Advantages of these thermoplastic polymer packagings include low unit cost, nonbreakability and an attractive appearance secured through nearly infinite variety in container contour and coloring. Use of thermoplastic polymer for low-cost-per-unit packaging has greatly increased sales of thus packaged consumer goods. The advantages of thermoplastic polymer packaging are not presently available, however, to a number of permeatingly active products such as cosmetics and polishes, which otherwise are ideally adapted to being marketed in thermoplastic polymer packaging. These permeatingly active materials contain essential oils, liquid hydrocarbons, organic esters and ketons which permeate thermoplastic resins. A damaged, unattractive and unsaleable package may result from such permeation. Also, oxygen from the atmosphere can permeate the thermoplastic polymer package and cause deterioration of packaged goods such as cooking oils, where rancidity develops, and oxygen-sensitive materials such as certain photographic compositions.

Highly desirable thermoplastic polymers for packaging are olefin high polymers because they offer good rigidity without brittleness and can easily be fabricated into attractive shapes. Olefin high polymers are therefore the preferred thermoplastic polymer substrates for use in this invention. The term "olefin high polymers" is used in the present specification and claims to denote homopolymers of monoolefinically unsaturated monomers containing from 2 to 10 carbon atoms inclusive and copolymers containing about 70 percent by weight, and preferably at least about 90 percent by weight, of a monoolefinically unsaturated monomer containing from 2 to 10 carbon atoms inclusive, with from about 30 percent by weight to about 10 percent by weight of at least one other olefinically unsaturated monomer co-polymerizable therewith, in every case the olefin high polymer being normally solid and of sufficient molecular weight that it can be fabricated into packaging. Illustrative of the suitable homopolymers and copolymers which can be used as olefin high polymer substrates for the barrier coatings of this invention are homopolymers such as low density polyethylene, i.e., essentially linear ethylene polymer having a density of from about 0.91 to about 0.94, and, preferably, high density polyethylene, i.e., essentially linear ethylene homopolymer having a density above about 0.94; other homopolymers such as polypropylene, polybutene-1, poly(3-methylpentene-1), polyhexene-1, polyhetene-1, polyvinyl chloride, and the like; and copolymers, such as, for example, ethylene/propylene copolymers, styrene/acrylonitrile copolymers, ethylene/butene-1 copolymers, ethylene/ethyl acrylate copolymers, ethylene/methyl methacrylate copolymers, ethylene/vinyl acetate copolymers, and the like.

While olefin high polymers are preferred, other thermoplastic polymer substrates such as polycarbonates and the like may be used in this invention.

Heretofore, thermoplastic polymers such as high density polyethylene and other olefin high polymers have been rendered impermeable to liquids and gases by forming a barrier coating thereon. The term "barrier coatings" as used herein refers to non-self-supporting films formed on a thermoplastic resin substrate of material having impermeation properties superior to the thermoplastic resin substrate on which it is formed and to which it adheres. Barrier coatings for thermoplastic polymer substrates can be broadly classified into two groups: (1) those applied from organic solvent solution and (2) those applied from a water solution. The disadvantages of the former method and the materials used therein are obvious; use of organic solvents appreciably increases raw material costs, necessitates recovery steps and introduces flammability and toxicity hazards.

Barrier coatings which can be applied from water solution are highly desirable. Polyvinyl alcohols, which are polymers containing $(CH_2—CHOH)$ groups, can be applied from water solution and are in many respects attractive materials for use as barrier coatings for thermoplastic polymer substrates. Applied to thermoplastic polymer surfaces which have been treated by any of a number of means to render them receptive to coatings, polyvinyl alcohols adhere tenaciously, are flexible, clear and transparent, provide an oxygen impermeable barrier, and are resistant to permeation by greases, oils and a wide variety of common organic solvents, such as esters, ethers, ketones, hydrocarbons and chlorinated hydrocarbons.

The advantage of water solubility in the application of polyvinyl alcohol as a barrier coating becomes its chief drawback, however, when the barrier coating has been formed on the thermoplastic polymer. The poor water resistance of polyvinyl alcohol restricts its use as a barrier coating to those very few applications where nearly anhydrous conditions prevail.

There a number of methods known for increasing the water resistance of polyvinyl alcohol, but none provides entirely satisfactory results. In spite of various heretofore practiced methods, such as crosslinking the polyvinyl alcohol with potassuim dichromate, formaldehyde or phenol-formaldehyde resins, the polyvinyl alcohol still tends to soften, swell and lose adhering strength when exposed to water or even moisture vapor. Hence, polyvinyl alcohol barrier coatings cannot be used where a substantial degree of water-resistance or moisture-proofness is required.

It is an object, therefore, of the present invention to provide polyvinyl alcohol barrier coatings for thermoplastic polymer substrates which offer outstanding water resistance in addition to tenacious adhesion to the substrate, clarity and flexibility.

It is another object to provide a method for applying from water solution water-resistant polyvinyl alcohol barrier coatings for thermoplastic polymer substrates.

It has now been discovered that these and other objects of the invention are achieved by applying to the thermoplastic polymer substrate a water solution of polyvinyl alcohol and a polymethyl ether of polymethylol melamine (referred to hereinafter as PMM) and thereafter maintaining the coated substrate at an elevated temperature for a time sufficient to inter-react substantially all of the PMM compound with the polyvinyl alcohol. The resulting cured barrier coating is a water-resistant polyvinyl alcohol which is tenaciously adherent, very flexible and clear.

The superiority of barrier coatings formed by the method of this invention is believed due to a crosslinking of the polyvinyl alcohol (PVA). That a high degree of inter-reaction takes place between the polyvinyl alcohol and the PMM i.e., that there is extensive crosslinking of the polyvinyl alcohol, is shown by the fact that barrier coatings on thermoplastic polymer substrates comprising polyvinyl alcohol alone are readily soluble in water as described above; but, polyvinyl alcohol-PMM barrier coatings are not dissolved or softened away from thermoplastic polymer substrates by either organic solvents or water.

The polymethyl ethers of polymethylol melamines are well known in the art as are methods for preparing them. Reference is made to U.S. 3,065,109 which discloses their preparation. Polymethylol melamines can be prepared by reacting one mol of melamine with at least two mols of formaldehyde. A fully methylolated melamine, such as hexamethylol melamine, can be prepared by reacting at least six mols of formaldehyde with one mol of melamine. In order to obatin the desired methyl ether, the polymethylol melamines thus produced are reacted with the requisite amount of methanol. Thus, for example, reacting two mols of methanol with one mol of a dimethylol melamine results in the formation of the dimethyl ether of dimethylol melamine. Higher methylol melamines can be reacted with from two to six mols of methanol as determined by the number of available methylol groups and the degree of etherification desired. For example, starting with tetramethylol melamine, it is possible to prepare the dimethyl ether and the tetramethyl ether. It is also possible to produce, as a further illustration, a trimethyl and pentamethyl ether of hexamethylol melamine. Upon complete etherification of hexamethylol melamine, the hexamethyl ether or hexakis (methoxymethyl)melamine is produced.

Hexakis(methoxymethyl)melamine (referred to hereinafter as HMM) is the preferred PMM in this invention although others can be used. HMM is readily soluble in water, low molecular weight alcohols, and phenols, sparingly soluble in low molecular weight ketones, esters, nitromethane and similar polar solvents. It is substantially insoluble in hydrocarbons, halogenated hydrocarbons and similar nonpolar solvents. An aqueous solution of this compound can be freely diluted with water soluble polar solvents such as methanol, ethanol, isopropanol, acetone and the like. HMM can be represented by the formula

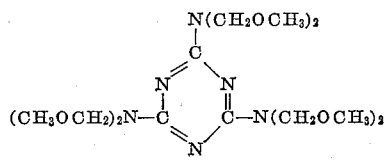

HMM can be blended with the polyvinyl alcohol as a solid or, for greater convenience, as an aqueous solution. A very convenient and high desirable form of HMM for use in the method of this invention is an 85/15 water/ethanol solution thereof containing about 50% by weight of HMM.

"Polyvinyl alcohol" as the term is used in the present specification and claims refers to a normally solid polymeric material, soluble in water, but insoluble in most organic solvents and characterized by the presence of $-(CH_2-CHOH)-$ units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is the degree of hydrolysis of the polyvinyl alcohol thus formed and indicates the percent of hydroxyl groups present in the polyvinyl alcohol out of the total possible hydroxyl groups. As is explained hereinbelow the crosslinking reaction by which the superior barrier coatings of this invention are obtained proceeds through the hydroxyl groups on the polyvinyl alcohol. Therefore only substantially completely hydrolyzed polyvinyl alcohols are useful in this invention. By the term "substantially completely hydrolyzed" in the present specification and claims is meant a degree of hydrolysis of above about 85%. A polyvinyl alcohol with less than about 85% degree of hydrolysis will react only very slightly with the HMM compound and give inferior, nonomoisture-proof coatings. We have found that polyvinyl alcohols having an hydroxyl content above 88% and particularly above about 95% provide superior barrier coatings in terms of water and solvent resistance, clarity and flexibility and adhering strength. Hydroxyl group contents of 99% to 100% provide the best barrier coatings and are particularly preferred for use in this invention. Moreover, these latter polyvinyl alcohols exhibit maximum rate of cure with HMM to a completely cured, thoroughly crosslinked resin coating.

Properties of the final crosslinked polyvinyl alcohol are also to an extent dependent upon the molecular weight of the polyvinyl alcohol used. Generally speaking, the higher the molecular weight of the polyvinyl alcohol, the greater the strength of the cured barrier coating. The higher molecular weight polymers, however, due to their great chain lengths are less soluble in water than intermediate and lower molecular weight polymers. Ease of incorporation and dissolution of intermediate and lower molecular weight polymers makes these preferable from a processing standpoint. The relative molecular weight of polyvinyl alcohols can be conveniently determined by preparing a 4% by weight aqueous solution of the polymer and determining the viscosity in centipoises by the Hoeppler falling ball method described in "Viscosity Measurement of Liquid Substances and a New Universal Viscometer," Chem. Zeitung 59 62–63 (1933). We prefer polyvinyl alcohols whose molecular weights as determined by the Hoeppler method provide viscosities, herein termed "4% viscosity," or between about 2 and 50 centipoises. We have found that such polymers provide solutions having desirable viscosities at practical concentrations of polymer for coating applications. Ordinarily, coating solutions contain from about 5 to about 50 parts by weight of solids per 100 parts by weight of the coating solution. Such coating solutions can be conveniently applied to a high density polyethylene resin substrate by a wide variety of techniques such as roller coating, brushing, spraying, knife-coating, dipping or slushing, or equivalent coating techniques. Greater than 50% solids in the barrier coating solutions of our invention generally result in a highly viscous solution which is difficult to apply, especially with automatic equipment. On the other hand, less than about 5% by weight of solids provides a generally uneconomical coating solution which is likely too fluid to be sprayed onto a surface satisfactorily. Such solution, however, does cling sufficiently when dip coated on a polyethylene substrate to provide adequate barrier coatings. We prefer 10 to 25% solids in our coating solutions for their easy applicability.

The optimum polyvinyl alcohol-HMM ratio in the barrier coatings is in some degree dependent upon the particular polyvinyl alcohol used and the combination of properties desired. In general, an increase in the proportion of polyvinyl alcohol having a given degree of hydrolysis increases the flexibility of the product; an increased proportion of HMM, on the other hand, gives increased rates of cure and increased water and organic solvent resistance. The use of as little as 5% by weight of HMM in our compositions is beneficial, imparting improved barrier properties to the coating. For example, a composition containing 5 parts of HMM per 100 parts by weight of substantially completely hydrolyzed polyvinyl alcohol exhibits improved water resistance over that exhibited by the polyvinyl alcohol alone. The obtaining of maximum barrier properties generally requires a higher HMM to polyvinyl alcohol weight ratio, about 10 to 50 parts of the former per 100 parts of the latter, and preferably from 10 to 40 parts of HMM per 100 parts of polyvinyl alcohol. Increases in the ratio beyond 50 parts per 100 parts of polyvinyl alcohol progressively reduce flexibility of the barrier coatings although progressively increasing solvent and water resistance. Such higher HMM proportions hence are useful where the solvent resistance properties are of paramount importance and flexibility of comparatively less importance.

Modifiers such as pigments, stabilizers, gel depressants, surfactants, antioxidants, extenders and the like can be incorporated and dispersed in the barrier coating composition, as by mixing in a paint mill, ball mill, paddle blender or the like provided their presence does not too adversely affect the requisite barrier properties of the coating.

In a preferred procedure the barrier coatings are prepared and applied to high density polyethylene substrates to give barrier coating polyethylene articles in the following manner:

A polyvinyl alcohol having a viscosity of between 4 and 35 centipoises and preferably 4 to 10 centipoises is dissolved in an 85/15 water/ethanol mixture. To facilitate and make more rapid curing of the polyvinyl alcohol the solution is acidified to a pH of 5 or less using mineral acids such as hydrochloric, sulfuric, phosphoric, sulfonic acids and the like or organic acids such as p-toluenesulfonic or oxalic acid; or acidic salts of such acids, e.g., ammonium sulfamate, zinc nitrate, aluminum chloride and the like; or esters such as tris(beta-chloroethyl)-phosphate. Other acidic or acid ($H^+$) releasing compounds than these can be used provided under the conditions in which they are used they lower the pH of the coating mixture to less than 5. HMM is added to the acidified solution of polyvinyl alcohol as a solution in an 85/15 water/ethanol mixture to give the desired ratio of components. It is important to note that the HMM-polyvinyl alcohol compositions used as barrier coatings can be crosslinked by heat alone, but these compositions cure more slowly without a catalyst. Ethanol is used as a coupler solvent in these formulations to prolong pot life and impart anti-foam properties. About 0.5% of dioctyl sodium sulfosuccinate can also be added to promote good wetting the polymer substrate.

After preparation of the coating solution the thermoplastic polymer substrate which has been pretreated to render it more receptive to coatings or not as desired is coated with a sufficient thickness of barrier coating composition, usually at least about 0.1 mil thickness to impart properties of the barrier to the substrate. Following application of the coating the coated substrate is cured at 95° C. or higher for a time sufficient to substantially completely crosslink the polyvinyl alcohol. This time will be roughly proportional to the thickness of the coating on the substrate using a given composition but will naturally vary with the presence or absence of acidic conditions, heat applied, ratio of components and degree of hydrolysis of the polyvinyl alcohol. Optimum water-resistance is achieved when the compositions are completely cured at a temperature of 95° C. and more. Where water-resistance is not highly critical it is possible to cure at less than 95° C. and hence coat thermoplastic polymer substrates unable to withstand heat in excess of 95° C. Ordinarily though, it will be desired to impart water-resistance and hence thermoplastic polymers having heat distortion temperatures in excess of the cure temperature must be employed. For all practical purposes this requires thermoplastic polymer which can withstand temperatures in excess of 95° C. as evidenced by the polymer being able to support its own weight without warping at a temperature of about 95° C.

The following examples are presented to illustrate the practice of the present invention and are not intended as limitative of its scope. All parts and percentages are by weight.

EXAMPLE 1

A coating composition was prepared by dissolving 1192 parts of polyvinyl alcohol (99% hydrolyzed, 4% viscosity: 4–6 centipoises) in 6118 parts of water at 90–95° C. with continued mechanical agitation. When solution was complete, the temperature was lowered to 25° C. and 2622 parts of a 1:1 (by weight) water/ethanol mixture was slowly added followed by 66.8 parts of a 10% aqueous solution of dioctyl sodium sulfosuccinate. The pH of the solution was adjusted to 2.0 by the addition of 85% ortho-phosphoric acid. A premixed crosslinking solution consisting of 119 parts of HMM, hexakis-(methoxymethyl)melamine, 101 parts of water and 18 parts of ethanol was stirred into the polyvinyl alcohol solution just before using. The final solution has a pot life of 8 to 12 hours and a solids content of about 13.5%.

EXAMPLE 2

Another useful coating composition was prepared by mixing the polyvinyl alcohol solution described in Example 1 with a crosslinking solution consisting of 596 parts of HMM, 506.5 parts of water and 89.5 parts of ethanol. The solids content of this composition is 16.6%.

EXAMPLE 3

The barrier properties of the coating composition prepared in Example 1 were demonstrated as follows. One series of 8 oz. cylindrical bottles molded from high density detergent grade polyethylene was inner coated with this composition by filling and draining followed by a 10 minute cure at 104° C. The bottles were filled with various liquids, viz., carbon tetrachloride, a lemon oil/ethanol mixture (20/80 by volume), turpentine, a gasoline/water mixture (80/20 by volume) and West-Pine. Another series of uncoated polyethylene bottles filled with the same liquids were used as controls. The bottles were stored for 48 days and the weight percent loss of contents recorded. The results are delineated in Table I below.

*Table I*

WT. PERCENT LOSS OF BOTTLE CONTENTS

| Permeant | Non-Coated Control | Example 1 Compositon Coating |
|---|---|---|
| Carbon tetrachloride | 17.3 | 0.27 |
| Lemon oil/Ethanol 20/80 by volume | 2.93 | 0.13 |
| Turpentine | 1.49 | 0.03 |
| Gasoline/water 80/20 by volume | 13.1 | 1.9 |
| West-Pine (A pine oil cleanser containing cocoanut soap, orthobenzyl parachlorophenol, and the sodium salt of ethylenediamine tetracetic acid) | 1.08 | 0.09 |

The dry oxygen permeability of polyethylene coated with the Example 1 composition was also measured against uncoated polyethylene as a control according to ASTM 1434–56T. The permeability of the control was 138 cc. mil./100 in.$^2$ 24 hrs. atm. as opposed to a value of 1.2 for the coated specimen.

EXAMPLE 4

The effect of the percent of HMM on the cured polyvinyl alcohol barrier properties was evaluated in 8 oz. high density polyethylene bottles using gasoline/water 80/20 by volume and lemon oil/ethanol 20/80 by volume as permeants. The coating compositions were prepared as in Example 1 with the exception that the percent HMM was varied from 0 to 250 percent based on the weight of polyvinyl alcohol used. Data showing percent weight loss of the permeants from the polyethylene bottles after 19 and 27 days are recorded in Table 2 below.

Table 2
EFFECT OF HMM LEVEL ON BARRIER PROPERTIES

| Percent HMM based on polyvinyl alcohol content | Days Stored | Percent Wt. loss at 70° F. | |
|---|---|---|---|
| | | Gasoline/ Water 80/20 | Lemon Oil/ Ethanol 20/80 |
| 0 | 27 | | 1.33 |
| 5 | 27 | 1.23 | 0.03 |
| 10 | 27 | 1.00 | 0.04 |
| 25 | 27 | 1.42 | 0.04 |
| HMM alone | 27 | 3.10 | 2.28 |
| Control noncoated | 27 | 11.5 | 1.44 |
| 50 | 19 | 0.54 | 0.05 |
| 100 | 19 | 0.28 | 0.39 |
| 148 | 19 | 0.38 | 0.32 |
| 250 | 19 | 0.32 | 0.15 |
| Control noncoated | 19 | 9.1 | 0.88 |

EXAMPLE 5

The effect of the molecular weight of the polyvinyl alcohol used on the barrier properties of the HMM cured composition was demonstrated by weight loss measurements of gasoline/water 80/20 by volume and of lemon oil/ethanol 20/80 by volume from the 8 oz. high density polyethylene bottles.

One composition was prepared as in Example 1 with fully hydrolyzed low molecular weight polyvinyl alcohol, that is, having a viscosity of 4–6 centipoises as a 4% aqueous solution at 25° C., and 40% HMM. A second composition was prepared in which fully hydrolyzed medium viscosity polyvinyl alcohol was used, that is, having a viscosity of 20–32 centipoises as a 4% aqueous solution at 25° C.

Using the gasoline/water permeant, a 0.18% weight loss was recorded after 2 weeks with composition one and 0.49% weight loss with composition two as compared with a 4.9% weight loss when no barrier coating was employed.

Using the lemon oil/ethanol permeant, a 0.6% weight loss was recorded with composition one and 0.08% weight loss with composition two as compared with 0.62% with no barrier coating.

EXAMPLE 6

The use of the trimethyl ether of hexamethylol melamine as a crosslinking agent in the polyvinyl alcohol barrier coating compositions is demonstrated by its substitution for hexakis(methoxymethyl)melamine in the procedure described in Example 1. Substantially similar results are obtained when this formulation is used as a barrier coating as in the method described in Example 3.

EXAMPLE 7

The barrier coating compositions described in Examples 1, 2 and 6 afford resistance to permeants similar to that described in Example 3 when applied to bottles fabricated from styrene/acrylonitrile copolymer, polyvinyl chloride, polypropylene, ethylene/ethyl acrylate copolymer, ethylene/vinyl acetate copolymer, and polycarbonate prepared from the reaction of bisphenol-A and a carbonate precursor such as phosgene.

EXAMPLE 8

When the barrier coating composition described in Example 1 was evaluated for barrier coating properties as in Example 3, but with a cure time of 30 minutes at 95° C., the results were substantially the same as those obtained with a 10 minute cure at 104° C.

What is claimed is:

1. Barrier coated article comprising an olefin high polymer, selected from the group consisting of high density polyethylene, low density polyethylene, polypropylene, polybutene-1, poly(3-methylpentene - 1), polyhexene-1, polyheptene-1, ethylene/propylene copolymer and ethylene/butene-1 copolymer, capable of supporting its own weight without warping at about 95° C. and adhering thereto a film comprising a cured mixture of 100 parts by weight of substantially completely hydrolyzed polyvinyl alcohol and at least 5 parts by weight of a polymethyl ether of polymethylol melamine.

2. Barrier coated article claimed in claim 1 wherein said olefin high polymer is high density polyethylene.

3. Barrier coated article claimed in claim 1 wherein said olefin high polymer is low density polyethylene.

4. Barrier coated article claimed in claim 1 wherein said olefin high polymer is polypropylene.

5. Barrier coated article claimed in claim 1 wherein said olefin high polymer is polybutene-1.

6. Barrier coated article claimed in claim 1 wherein said olefin high polymer is poly(3-methylpentene-1).

7. Barrier coated article claimed in claim 1 wherein said olefin high polymer is polyhexene-1.

8. Barrier coated article claimed in claim 1 wherein said olefin high polymer is polyheptene-1.

9. Barrier coated article claimed in claim 1 wherein said olefin high polymer is ethylene/propylene copolymer.

10. Barrier coated article claimed in claim 1 wherein said olefin high polymer is ethylene/butene-1 copolymer.

References Cited by the Examiner
UNITED STATES PATENTS

| | | | |
|---|---|---|---|
| 2,804,402 | 8/1957 | Williams | 117—139.4 |
| 2,860,801 | 11/1958 | Nielsen | 117—138.8 X |
| 2,876,136 | 3/1959 | Ford | 117—161 |
| 2,985,542 | 5/1961 | Pinsky et al. | 117—138.8 |
| 3,065,109 | 11/1962 | Hensley | 117—138.8 |
| 3,071,430 | 1/1963 | McCance et al. | 117—161 X |

FOREIGN PATENTS

| | | |
|---|---|---|
| 1,195,447 | 5/1959 | France. |

WILLIAM D. MARTIN, *Primary Examiner.*

R. HUSACK, *Assistant Examiner.*